(No Model.) 3 Sheets—Sheet 1.

H. G. REIST.
ELECTRIC CONTROLLER.

No. 591,879. Patented Oct. 19, 1897.

WITNESSES:
A. H. Abell.
A. F. Macdonald.

INVENTOR:
Henry G. Reist
Geo. R. Blodgett
atty (No Model.) 3 Sheets—Sheet 3.

H. G. REIST.
ELECTRIC CONTROLLER.

No. 591,879. Patented Oct. 19, 1897.

Witnesses.
A. H. Abell.
A. F. Macdonald

Inventor.
Henry G. Reist, by
Geo. R. Blodgett,
Atty.

United States Patent Office.

HENRY G. REIST, OF SCHENECTADY, NEW YORK, ASSIGNOR TO THE GENERAL ELECTRIC COMPANY, OF NEW YORK.

ELECTRIC CONTROLLER.

SPECIFICATION forming part of Letters Patent No. 591,879, dated October 19, 1897.

Application filed March 9, 1897. Serial No. 626,582. (No model.)

*To all whom it may concern:*

Be it known that I, HENRY G. REIST, a citizen of the United States, residing at Schenectady, in the county of Schenectady, State of New York, have invented certain new and useful Improvements in Electric Controllers, (Case No. 532,) of which the following is a specification.

The present invention relates to electric controllers, which are employed for regulating the speed and direction of rotation of electric motors.

The invention has for one of its objects to provide, in a single-handle controller for an electric motor or motors, a reversing-switch so arranged that a movement in one direction causes a rotation of the motor-armature in one direction, and a movement in the reverse direction an opposite rotation of the armature, and a separate switch for regulating the motor coupled to the reversing-switch and worked from the same handle.

The invention has for another of its objects to provide in a single-handle controller two switches mounted on separate supports and connected for simultaneous operation, the switches being so arranged that one of them has a movement in two directions and the other in a single direction.

The invention also has for its object to so arrange the switches that one of them is moved at a varying rate of speed, while the operating-handle is moving at a given speed from the off to full-on position.

The invention further relates to certain novel features in the construction, more fully described and claimed hereinafter.

Figure 1:
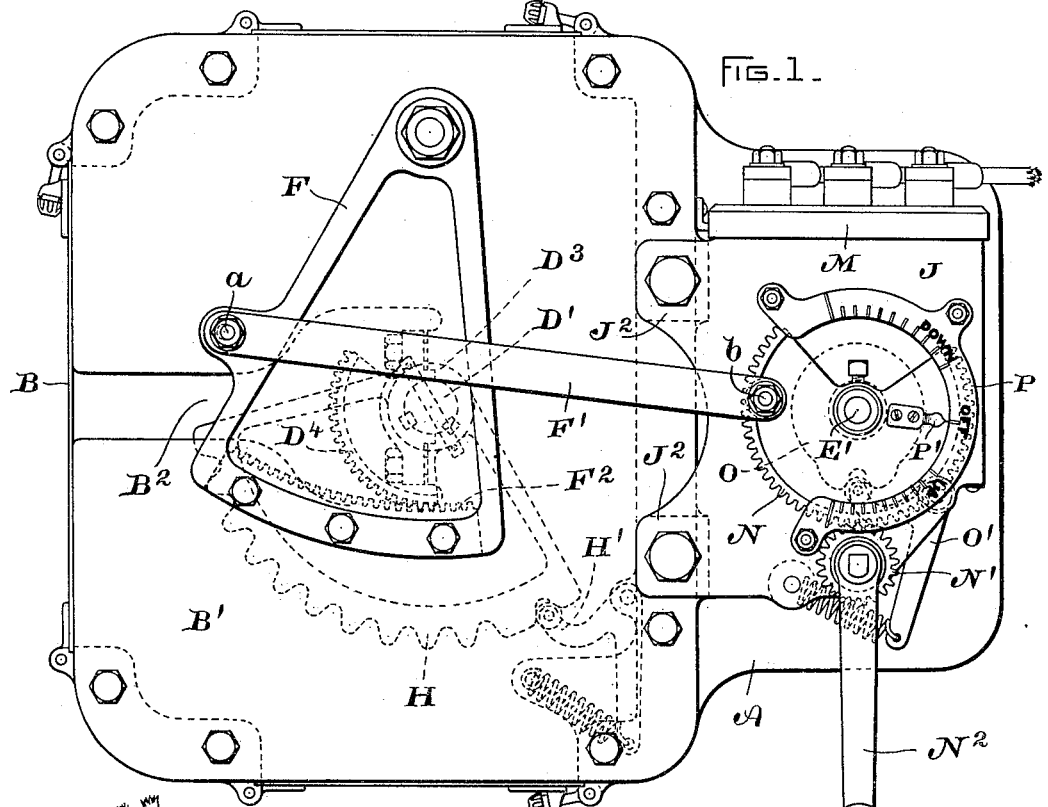
Figure 2:
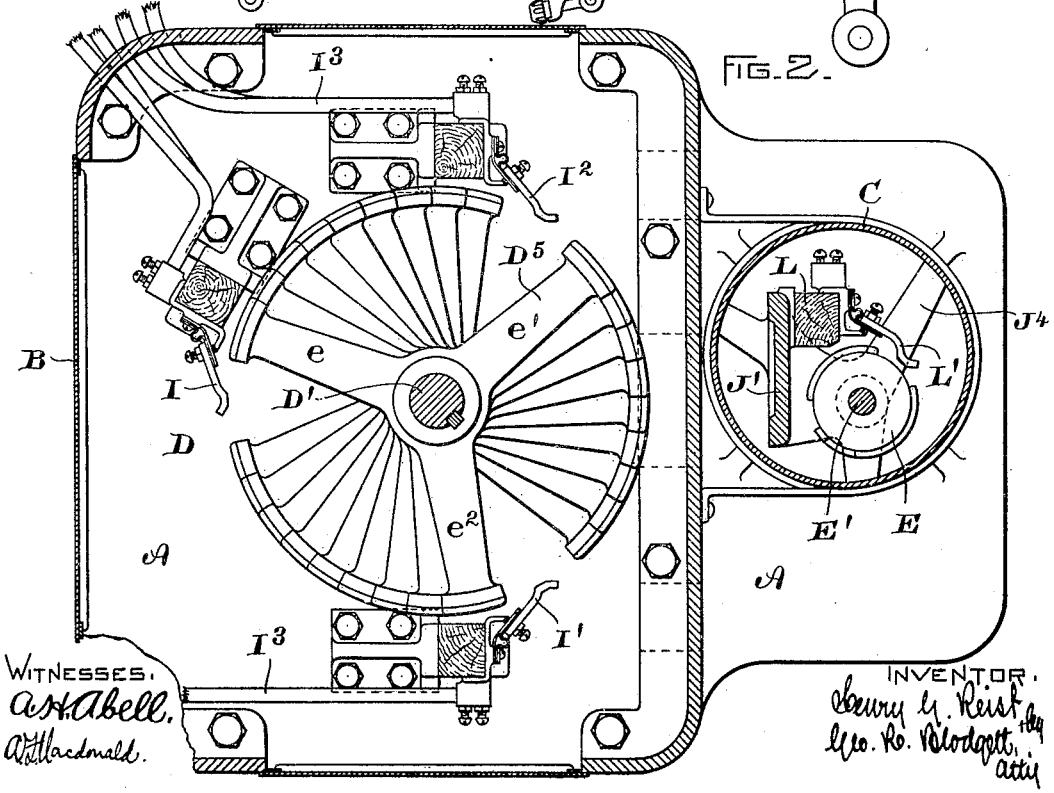
Figure 3:
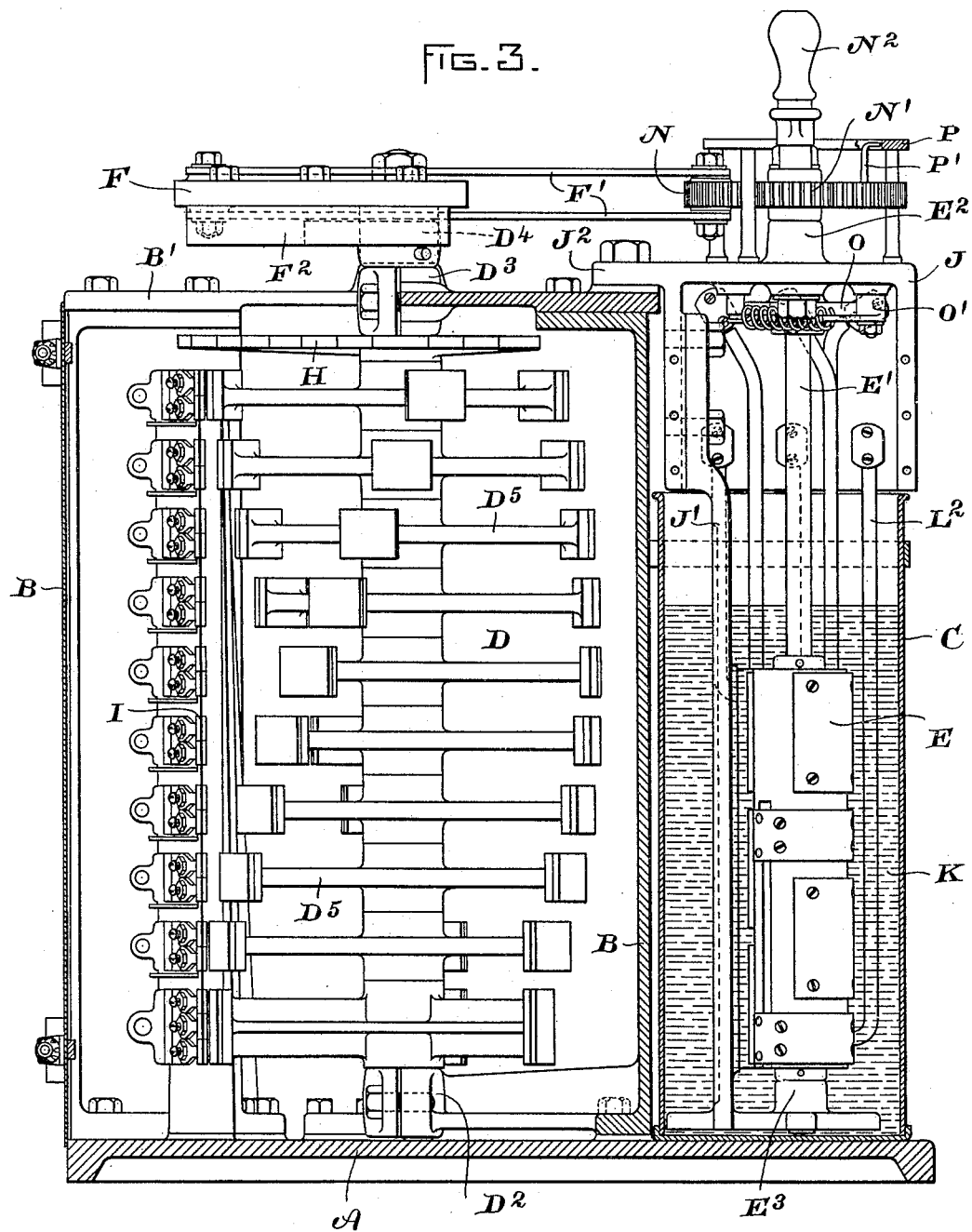
Figure 4:
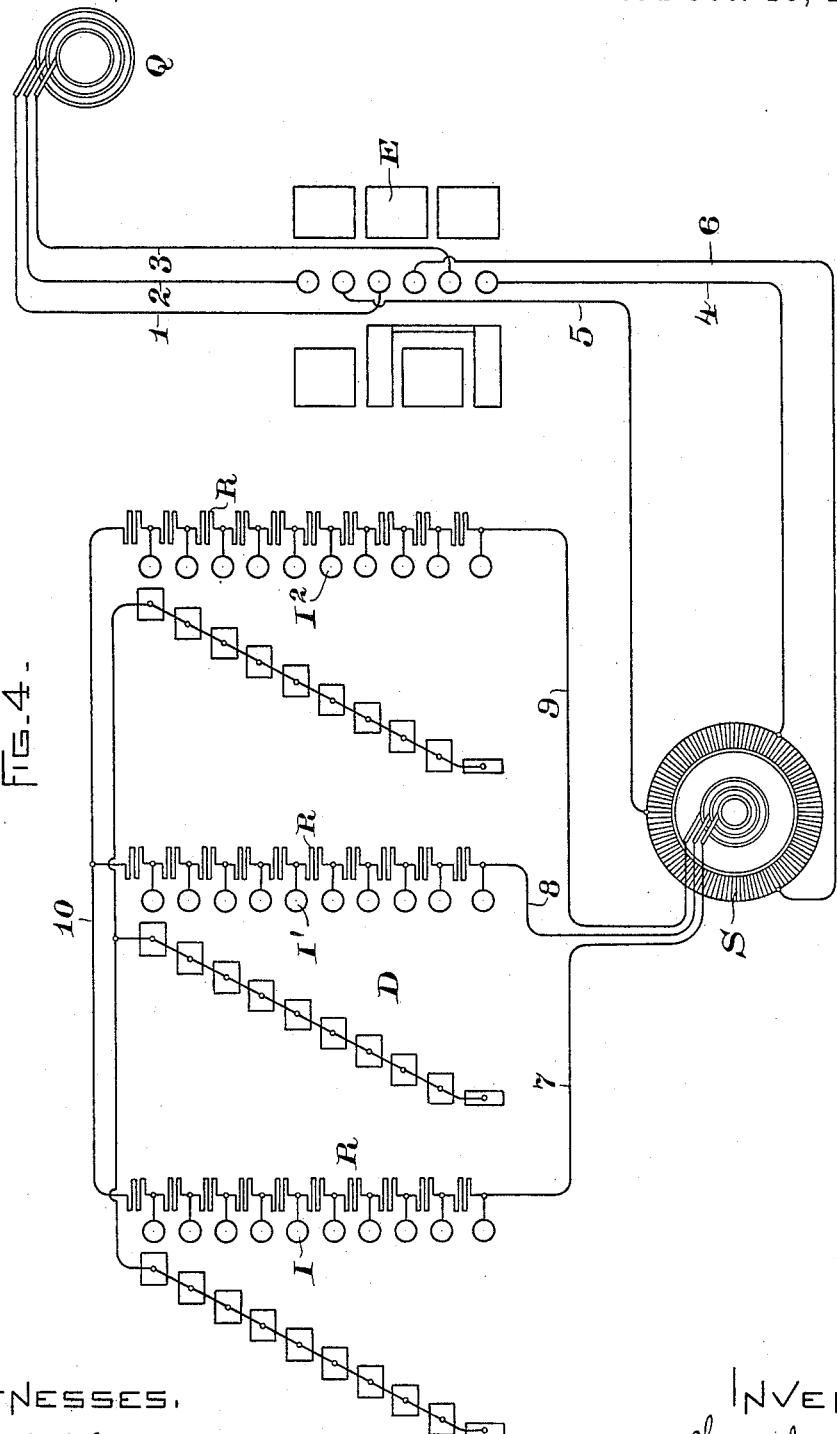

In the accompanying drawings, attached to and made a part of this specification, Figure 1 is a plan view of my improved apparatus. Fig. 2 is a sectional view showing the cap-plate removed. Fig. 3 is a front elevation partially in section, and Fig. 4 is a diagram of the circuit connections.

Mounted upon the base A are inclosing cases B and C. The case B contains the resistance-switch D, and the case C the reversing-switch E. The switch D is mounted for movement on the shaft $D'$, which is mounted at the lower end in a bearing $D^2$, formed on the case B, and at the top in a bearing $D^3$, which is a part of the cap-plate $B'$. The cap-plate $B'$ is substantially rectangular and is secured to the casing B by bolts. At $B^2$ is formed an opening, so that access may be had to the bearing $D^3$ and also to facilitate the removal of the shaft $D'$.

The sector F is pivotally supported on the cap-plate $B'$ and is given an oscillating movement by the parallel links $F'$, which connect it with the gear N. The gear is mounted on the shaft $E'$ of the reversing-switch. Bolted to the under side of the sector is a rack $F^2$, and engaging therewith is a segmental gear $D^4$, rigidly secured to the shaft $D'$. A segmental star-wheel H is keyed to the shaft $D'$, and engaging with the notches therein is a spring-pressed pawl $H'$, having a roller in its outer end. The star-wheel and pawl are so arranged with respect to the contacts on the cylinder D and the stationary brushes that the contacts will stop in a position making contact with the brushes.

Mounted on the shaft $D'$ and in electrical connection therewith are a number of spiders $D^5$, having arms $e$ $e'$ $e^2$ arranged, substantially, one hundred and twenty degrees apart and carrying at their outer ends contacts adapted to engage with the stationary rows of brushes I $I'$ $I^2$. The latter are mounted on vertical insulating-supports. These brushes are connected to the resistance by leads $I^3$ in a manner to be hereinafter described. It will be seen that the spiders $D^5$ are counterparts of one another and each is given a slight angular position in advance of the next succeeding one. By this construction I am enabled to use a single pattern for casting them, and by changing the position of the key-slot in each one the desired relation of the spiders on the shaft is obtained.

The reversing-switch E is mounted on a shaft $E'$, which is supported at the top by a bearing $E^2$, formed in the open bottom box J, and at the bottom in a bearing $E^3$, formed in the vertically-extending piece $J'$. The latter is bolted to the box J and provided with feet $J^4$ at the bottom, which engage with the inner periphery of the casing C. Surrounding the switch E and bearing $E^3$ is a circular casing C, preferably made of thin sheet metal and forming a liquid-tight casing for the oil K. The oil provides a simple and efficient means for taking care of the arcing at the contacts. By supporting both bearings from a point above the casing I am enabled to simplify the construction of the casing and to avoid all leaks, which invariably occur when a moving portion of a switch projects through the bottom of the casing. The removal of the parts for repairs and inspection is also facilitated.

To one side of the reversing-switch cylinder and mounted upon an insulating-support L, which is secured to the vertical piece J', are a vertical row of brushes L', engaging with the contacts on the switch-cylinder. The box J is provided with lugs $J^2$, which are secured to the cap-plate B' by bolts, and on the back side with a connection-board M, made of slate or other insulating material. Extending from the board to the stationary brushes L' are leads $L^2$.

On the upper end of the shaft E' is a gear N, meshing with the pinion N', which is mounted in a suitable bearing on the top of the box J, and is provided with an operating-handle $N^2$. Mounted on the shaft E' below the top of the box is a cam O, Figs. 1 and 3, and a spring-pressed lever O', having a roller on its free end, rests in a groove on the cam when the switch E is in the off position, and holds it against accidental movement. Located on the top of the box is a dial P, divided into three parts, for indicating the position of the switches.

With the parts arranged as shown both switches are in the off position. As the handle $N^2$ is rotated to the right the stationary brushes L' make contact with the contacts on the switch E. At the same time motion is imparted to the switch D through the sector F and links F', but the angular movement of sector F is less at the start than that of switch E, for in the position shown the center $b$ of the links is in line with the center $a$ of the links and the center of the shaft E. Hence at the start the movement of $b$ is substantially at right angles to a line connecting the centers $a$ and $b$, giving a very slight angular movement to the sector F, but one which increases rapidly as the gear N moves. This permits the switch E to fully establish its circuit connections without requiring more than a very slight movement of the switch D. It will be seen that in operation both switches are in engagement with the stationary brushes and that they operate simultaneously. The switch E has a movement in two directions, corresponding to opposite directions of the armature, but the arrangement of the switch D is such that it is moved in the same direction, no matter which way the reversing-switch is thrown from the off position. This enables me to reduce the size of the switch D one-half, for if it worked both ways a double set of contacts would be required. The gearing is so arranged that the handle $N^2$ makes somewhat less than one revolution while the switches are moving from off to the closing position.

In Fig. 4 I have shown a diagram of the circuit connections in which Q represents a three-phase generator supplying current to the mains 1, 2, and 3. The induction-motor S is connected by wires 4, 5, and 6 with the brushes of the reversing-switch E. The contacts are so arranged with respect to the brushes that a movement to the left will establish certain connections, causing the armature of the motor to revolve in one direction, and a movement to the right will reverse the connections of two of the wires, and consequently two of the phases, thereby causing the armature to rotate in the opposite direction. This will be understood from the diagram without tracing the connections from point to point in detail. The contacts on the switch D are shown developed on the same plane and are electrically connected. Between the members of each row of brushes I I' $I^2$ is connected resistance R, and the resistance of the several rows is Y-connected by the wire 10. The lowest brush in each row is connected by wires 7, 8, and 9 to the secondary member or armature of the motor S. Assuming that it is desired to start the motor, the circuit is closed at switch E, causing currents to be induced in the secondary winding of the motor which is closed through the resistance R. The resistance R is then gradually cut out of circuit by moving the contacts of switch D to the right with respect to the stationary rows of brushes. When the lowest contact in each line engages with the lowest brush in each row, the resistance will be entirely cut out. If it is desired to reverse the motor, the switch E is rotated in the opposite direction, so that the second set of reversing-contacts will engage with the stationary brushes, but the direction of movement of the switch D is the same as before.

While I have shown my invention in connection with a controller for a three-phase electric motor, it is evident that many of the features would apply equally well to other types of controllers.

What I claim as new, and desire to secure by Letters Patent of the United States, is—

1. In a controller for alternating-current induction-motors, the combination of a single switch for opening and closing the primary circuit of the motor and for reversing the motor, and a separate regulating-switch in the secondary circuit of the motor.

2. A controller for alternating-current induction-motors, comprising a resistance-switch for varying the resistance of the secondary circuit of the motor, a separate reversing-switch, and a common operating-handle for both switches.

3. In a controller for alternating-current induction-motors, the combination of a drum-switch connected with the secondary of the motor or motors for speed and power regulation, and a separate reversing-switch mechanically geared or connected with the regulating-switch, said switches being so constructed and connected that when the reversing-switch has been thrown in either direction, the regulating-switch may be actuated throughout its range of movement without interrupting or changing the circuit connections of the reversing-switch.

4. In a controller for an alternating-current motor or motors, the combination of a switch immersed in oil and arranged to make and break the motor-circuit, a second switch arranged to vary the resistance of the secondary member of the motor or motors, and means for actuating the switches.

5. In a controller for a three-phase motor or motors, the combination of a switch immersed in oil and arranged to make and break the primary circuit of the motor or motors, a second switch provided with three sets of contacts engaging with as many rows of stationary brushes and arranged to vary the resistance of the secondary member of the motor or motors, and means for actuating the switches simultaneously.

6. In a controller for an alternating-current induction-motor, the combination of a reversing and circuit-opening switch, an inclosing case in which the switch is immersed in oil, a resistance-switch arranged to simultaneously vary the resistance of each of the secondary windings of the motor, and a mechanical connection between the switches.

7. In an electric controller, the combination of a switch mounted for movement in two directions from an off position, means for including the switch in operative relation to the circuit while being moved in either direction, a second switch mounted for movement in a single direction from an off position, and means connecting the switches for simultaneous operation.

8. In an electric controller, the combination of a reversing-switch mounted for oscillating movement in two directions from an off position, brushes engaging therewith during both movements, a regulating-switch mounted for oscillating movement in a single direction from the off position, brushes engaging therewith, and means connecting the switches for simultaneous operation.

9. In an electric controller, the combination of a switch mounted for movement in two directions from an off position, means for including the switch in operative relation to the circuit while being moved in either direction, a second switch mounted for oscillating movement to one side of the off position and operatively connected to the circuit during said movement, and a mechanical connection between the switches for moving one of them at a greater speed than the other.

10. In an electric controller, the combination of a reversing-switch mounted for movement in two directions from an off position and operatively connected to the circuit during both movements, a resistance or regulating switch mounted for oscillating movement on one side of the off position and operatively connected to the circuit during said movement, and a link connecting the switches so arranged that the relative speed of one of the switches increases as the operating devices are moved from the off to full-on position.

11. In a controller for alternating polyphase motors, the combination of a resistance-switch mounted for oscillating movement, a plurality of sets or rows of contacts mounted on the switch, rows of stationary brushes mounted for engagement with the rows of contacts, a switch at which the main circuit is made and broken, and a mechanical connection between the switches for imparting a simultaneous movement thereto.

12. In a controller for a three-phase alternating-current motor, the combination of a resistance-switch mounted for oscillating movement, and comprising a three-arm spider, contacts on the arms, three rows of stationary brushes mounted for engagement with the corresponding rows of contacts, a reversing-switch at which the circuit is made and broken, and a mechanical connection between the switches.

13. In a controller for a three-phase electric motor, or motors, the combination of a resistance-switch arranged to vary simultaneously the resistance of the secondary windings, a reversing-switch for connecting the motor or motors to the source of supply and reversing the direction of rotation, a mechanical connection between the switches, a pinion engaging with a gear mounted on the shaft of one of the switches, and an operating-handle for the pinion.

14. In a controller, the combination of a switch-cylinder mounted on a shaft, bearings for the cylinder supported from a point above the cylinder, stationary brushes engaging with the cylinder, and an inclosing casing in which the stationary brushes and cylinder are submerged in oil.

15. In a controller, the combination of a switch-cylinder mounted on a shaft, a bearing for the upper end of the shaft secured to the cap-plate or other fixed portion of the controller, a lower bearing for the shaft mounted in a piece extending downward from the cap-plate, stationary brushes mounted on the downwardly-extending piece and engaging with the contacts on the cylinder, an inclosing case in which the cylinder and brushes are submerged in oil, and an operating device for the switch.

16. In a controller, the combination of a switch, a shaft therefor, counterpart spiders mounted thereon, each spider being provided with a plurality of arms, the position of the spiders on the shaft being such that the arms of one spider are displaced angularly with respect to another.

In witness whereof I have hereunto set my hand this 8th day of March, 1897.

HENRY G. REIST.

Witnesses:
B. B. HULL,
A. F. MACDONALD.